United States Patent [19]

Garvie

[11] Patent Number: 5,334,563
[45] Date of Patent: Aug. 2, 1994

[54] CERAMICS COMPOSITE MATERIAL AND PRODUCTION THEREOF

[75] Inventor: Gudrun H. Garvie, Beaumaris, Australia

[73] Assignee: Commonwealth Scientific and Industrial Research Organization, Campbell, Australia

[21] Appl. No.: 979,871

[22] PCT Filed: Aug. 23, 1991

[86] PCT No.: PCT/AU91/00382

§ 371 Date: Feb. 23, 1993

§ 102(e) Date: Feb. 23, 1993

[87] PCT Pub. No.: WO92/03391

PCT Pub. Date: Mar. 5, 1992

[30] Foreign Application Priority Data

Aug. 23, 1990 [AU] Australia .............................. PK1889

[51] Int. Cl.$^5$ ........................ C04B 35/48; C04B 35/49
[52] U.S. Cl. ..................................... 501/105; 501/94; 501/104; 501/120; 501/153; 264/66
[58] Field of Search ................... 501/94, 97, 105, 120, 501/137, 153, 89; 264/66

[56] References Cited

U.S. PATENT DOCUMENTS 5,130,277  7/1992  Ueda et al. ............................ 501/88

*Primary Examiner*—Karl Group
*Assistant Examiner*—Chris Gallo
*Attorney, Agent, or Firm*—Sughrue, Mion, Zinn, Macpeak & Seas

[57] ABSTRACT

A known relatively dense composite refractory material has a matrix of a refractory material and a dispersed phase in the form of particles of a ceramic material, each dispersed particle comprising an agglomerate of strongly bonded microcrystals, which exhibit strong thermal expansion anisotropy and do not crack spontaneously on cooling from about 1600° C. to ambient temperature. The thermal shock resistance of this composite refractory material is improved by (a) ensuring that the matrix material comprises from 5 to 90 percent by volume of grains having a diameter in the range of from 15 micrometers to about 80 micrometers, and/or (b) including at least one thermal down-quench of from 50° C. to 1500° C. in the final cooling step in the production of the composite refractory material. Alumina is a typical matrix material, with monoclinic zirconia as the dispersed phase.

12 Claims, No Drawings

CERAMICS COMPOSITE MATERIAL AND PRODUCTION THEREOF

TECHNICAL FIELD

This invention concerns refractories. More particularly, it concerns refractory materials in which polycrystalline ceramic particles have been dispersed within a matrix of a refractory material to produce a composite refractory material that exhibits good thermal shock resistance, reasonably high mechanical strength and good resistance to corrosion.

BACKGROUND

In the specification of Australian patent No 591,802, which is essentially the same as WIPO Publication No WO 88/01258, it is pointed out that it is well known that refractory materials cannot be, simultaneously, mechanically strong, dense (which implies good corrosion resistance) and thermal shock resistant. For example, if samples of a dense alumina refractory are heated in a furnace to progressively higher temperatures and then quenched in water to room temperature, and the mechanical strength of the quenched samples is measured, it will be found that at a critical temperature (which varies according to the size of the sample and the conditions under which the experiment is conducted), there is a sudden and significant reduction in the strength retained by the sample after the quenching. In one reported instance, experiments with samples of a dense alumina showed that:

(a) after quenching the samples to room temperature (about 20° C.) following their heating in a furnace to temperatures below 150° C., the modulus of rupture of the quenched samples remained high (about 230 MPa in a test run conducted by the present inventor); thus no deterioration of the mechanical strength of the sample had resulted from the quenching from 150° C. to ambient temperature;

(b) when the samples were quenched to room temperature after heating to a furnace temperature of about 150° C., the modulus of rupture of the quenched samples dropped dramatically (to about 60 MPa in the test run), showing that the thermal stresses generated during the quench were sufficient to activate pre-existing surface flaws (cracks) in the alumina refractory, and these flaws had propagated catastrophically through the material, causing the sudden loss of strength of the quenched sample; and (c) when the samples were quenched to room temperature from temperatures in excess of about 240° C., the strength of the quenched samples fell approximately exponentially as the temperature drop of the thermal quench increased, the modulus of rupture of the samples reaching a value of about 19 MPa in the test run when the furnace temperature was 400° C.

To reduce the dramatic change of mechanical strength due to unstable crack propagation in the quenching process, the traditional approach has been to introduce porosity into the refractory material. This reduces the low temperature strength of the refractory but the effect of quenching from higher temperatures is less dramatic. For example, samples of the same alumina material that has been described above which contain 5 percent porosity had an inherent low temperature strength of about half that of the dense material, and the low temperature modulus of rupture was approximately 103 MPa. When the samples were heated to the critical temperature of 150° C., quenching to room temperature reduced the strength of the material with 5 percent porosity, but the modulus of rupture of the quenched material was about 87 MPa. Quenching samples of this material to room temperature from a temperature of 400° C. produced samples having a modulus of rupture of about 70 MPa.

A refractory brick which is high in alumina content and has a porosity in the range from 15 percent to 25 percent completely solves the thermal shock problem. The modulus of rupture of quenched samples of such a material varies substantially linearly from about 19 MPa when the material is quenched from low temperatures to about 17 MPa when it is quenched from a temperature of about 400° C. The small loss in mechanical strength when the material is quenched from higher temperatures is due to stable crack propagation. It is clear that with the increase in porosity, the mechanical strength at low temperatures has been sacrificed, being only about one tenth of the strength of a dense commercial alumina ceramic material. However, an even more serious sacrifice in performance of the brick has also occurred. With a porous alumina refractory brick, the rate of slag erosion (corrosion) of the alumina increases exponentially with the increase in porosity.

The aforementioned specification of Australian patent No 591,802 (WIPO Publication No WO 88/01258) discloses a range of refractory materials which are reasonably strong, are resistant to thermal shock, and are also corrosion resistant (that is, they are quite dense materials). Those materials are composite refractory materials which have a porosity which does not exceed 12 percent and which comprise a matrix of a refractory material with particles of a ceramic material dispersed in the matrix material. The dispersed particles occupy from 1.0 percent by volume to 40 percent by volume of the composite refractory material, and each dispersed particle comprises an agglomerate of microcrystals which (i) are strongly bonded together, (ii) exhibit a strong thermal expansion anisotropy, and (iii) have a size such that cracks do not form spontaneously within the agglomerates during cooling from a temperature of about 1600° C. to room temperature. The ceramic material and the refractory material of the matrix are, of course, mutually chemically inert in the temperature range of the use of the composite refractory material.

Although such composite refractory materials perform well in their intended environments, it has been recognised that that it would be advantageous to produce refractory materials which have even better performance parameters than those of the materials described in the specification of Australian patent No 591,802. In particular, it is desirable to provide refractory materials possessing improved thermal shock resistance.

Hence it is an objective of the present invention to provide refractory materials which have better thermal shock resistance properties than the materials which constitute the invention of Australian patent No 591,802.

DISCLOSURE OF THE PRESENT INVENTION

In the development of the composite refractory materials described in t e specification of Australian patent No 591,802, the thermal shock resistance was imparted by the dispersed polycrystalline ceramic phase. It has now been discovered that such composite refractory materials can have their thermal shock resistance enhanced if their matrix material is modified. This is particularly so when the matrix material is a material which exhibits thermal expansion anisotropy (for example, alumina).

The modification of the matrix material which improves thermal shock resistance is the inclusion of coarse grains of the matrix material.

The mean grain size of the matrix phase of the materials produced in accordance with the invention of Australian patent No 591,802 is in the range of from 0.1 micrometer to 5 micrometers, and preferably about 1.0 micrometer. Typically, such materials have matrix material grains of diameter no greater than about 10 micrometers. In the composite refractory materials of the present invention, the matrix material has a fraction of coarser grains, with diameters in the range of from 15 micrometers to 80 micrometers. The fraction of coarser grains is from 5 percent to 90 percent by volume of the matrix material.

In addition, it has been discovered that the composite refractory materials of Australian patent No 591,802 will have an enhanced thermal shock resistance if, in the cooling step which concludes their production, the composite refractory materials are subjected to at least one thermal quenching step in which the "quench" can be small as 50° C. and as large as 1500° C., and is typically about 600° C.

Materials having the coarser grains in their matrix, in accordance with the first aspect of the present invention, may also be subjected to this beneficial thermal quenching.

Thus, according to the first aspect of the present invention, there is provided a composite refractory material, having a porosity which does not exceed 12 percent, the composite refractory material comprising (a) a matrix of a refractory material; and
(b) particles of a ceramic material dispersed in the matrix material, the dispersed particles occupying from 1.0 percent by volume to 40 percent by volume of the composite refractory material, each dispersed particle comprising an agglomerate of microcrystals which (i) are strongly bonded together, (ii) exhibit a strong thermal expansion anisotropy, and (iii) have a size such that cracks do not form spontaneously within the agglomerates during cooling from a temperature of about 1600° C. to room temperature; the ceramic material and the refractory material of the matrix being mutually chemically inert in the temperature range of the use of the composite refractory material;

further characterised in that
(c) the matrix material is a polycrystalline refractory ceramic material containing a fraction of from 5 percent to 90 percent by volume of grains having a diameter in the range of from 15 micrometers to about 80 micrometers.

Also, in accordance with a second aspect of the present invention, there is provided a method of making a composite refractory material of the type defined in claim 1 of WIPO publication No WO 88/01258 or in the last preceding paragraph, the method comprises the steps of:

(a) mixing together a powder of the matrix material, a powder of the polycrystalline ceramic material to be dispersed within the matrix material, and a fugitive binder;
(b) allowing the mixture to dry;
(c) granulating the dried powder mixture;
(d) preforming the granulated powder into at least one billet by die pressing;
(e) isostatically pressing the die pressed billet or billets to form a green billet or green billets for sintering;
(f) heating the green billet or billets at a predetermined rate until a sintering temperature in the range from 1200° C. to 1800° C. is reached;
(g) holding the green billet or billets at the sintering temperature for a period in the range from 0 to 5 hours; and
(h) cooling the sintered billet or billets to ambient temperature;

characterised in that
(i) during the cooling step, the (or each) sintered billet is either (i) thermally quenched to ambient temperature, the thermal quenching being effected when the sintered billet or billets have a temperature above ambient which is a value in the range of from 50° C. to 1500° C.; or
(ii) given at least one thermal quench, the quench being of a temperature change in the range of from 50° C. to 1500° C.

A description of embodiments of the present invention will now be provided, by way of example only.

DESCRIPTION OF ILLUSTRATIVE EMBODIMENTS

To illustrate the present invention, a composite refractory material comprising a matrix of alumina within which polycrystalline grains of monoclinic zirconia are dispersed, will be considered.

The alumina matrix material of refractory materials of this type, when made in accordance with the invention of Australian patent No 591,802, has a mean grain size which is usually in the range of from 0.1 micrometer to 5 micrometers (see claims 3 and 4 of Australian patent No 591,802 and WIPO publication No WO 88/01258). Occasionally, alumina grains having a diameter of about 10 micrometers are present in the matrix material. This lack of coarse alumina grains (in this specification, a coarse grain means a grain having a diameter of 15 micrometers or greater) is due sometimes to the fine particulate nature of the alumina powder used to make the composite refractory materials, and is due on other occasions to the presence of magnesia in the alumina powder. As noted in the specification of Australian patent No 591,802, magnesia is added to alumina as a sintering aid (typically, about 0.01 wt percent MgO is added to the alumina powder). However, magnesia is known to inhibit grain growth during sintering of alumina.

It has now been ascertained that if, in the manufacture of composite refractory materials which comprise an alumina matrix material with a dispersed phase of polycrystalline monoclinic zirconia, the alumina powder contains no magnesia additive, the grains of the matrix phase of the product material will grow during the sintering step in the production of the materials. In addition, it has been ascertained that if the sintering of the green billet or billets is maintained for a sufficient time, the matrix material will contain a fraction, in the range of from 5 percent to 90 percent by volume, of alumina grains which have diameters larger than 15 micrometers. In a similar manner, other matrix materials of the composite refractory bodies described in WIPO publication No WO 88/01258 exhibit grain growth when sintered for extended periods. Those skilled in this field will appreciate that the presence of large grains of matrix material reduces the sintering capability of the material. Hence it will be necessary to "hold" the composite refractory material at its sintering temperature for some time to produce a high fraction of coarse grains of the matrix material.

It has also been ascertained that if a powder batch for making billets of the composite refractory material of Australian patent No 591,802 contains coarse alumina grains of diameter 15 micrometers to 80 micrometers, the matrix material of the product refractory material will also contain such coarse alumina grains. The coarse alumina particles in such a powder batch, therefore, may comprise from 5 to 90 percent of the alumina powder used to make the composite.

Tests with composite alumina/zirconia materials containing coarse alumina (matrix) grains of diameter in the range of from 15 micrometers to 80 micrometers have shown that such materials have significantly enhanced thermal shock resistance, when compared with the alumina/zirconia composite refractory materials made in accordance with the disclosures in the specification of Australian patent No 591,802. But in other respects, namely density (porosity) and mechanical strength, the coarse-grained matrix material and the fine-grained matrix material are comparable.

In a further series of experiments, a number of samples of alumina/zirconia composite refractory materials, some having a fine-grained alumina matrix material, having been made in accordance with the invention of Australian patent No 591,802, some made in accordance with the present invention to have coarse grains of the alumina matrix material, were subjected to a range of thermal quenches.

In each case the samples were made by the steps of
(a) mixing together a powder of the matrix material, a powder of the polycrystalline ceramic material to be dispersed within the matrix material, and a fugitive binder;
(b) allowing the mixture to dry;
(c) granulating the dried powder mixture;
(d) preforming the granulated powder into billets by die pressing;
(e) isostatically pressing the die pressed billets to form green billets for sintering;
(f) heating the green billets at a predetermined rate until a sintering temperature in the range from 1200° C. to 1800° C. is reached;
(g) holding the green billets at the sintering temperature for a period in the range from 0 to 5 hours; and
(h) cooling the sintered billets to ambient temperature.

The quenching experiments were performed during the cooling step (h). In each case the quenching was into water at ambient temperature (about 20° C.) from an elevated temperature during the cooling step. The elevated temperature was varied. It was found that when the quenching was from a temperature in the range of from 50° C. above ambient temperature to 1500° C. above ambient temperature, the quenched billets had a superior thermal shock resistance when compared with the performance of similar materials which were not subjected to such a thermal "down-shock". Quenching into water from about 600° C. above ambient temperature was found to be particularly effective at enhancing thermal shock resistance.

It is believed that the improved thermal shock resistance following a thermal quenching step during the cooling of the sintered composite materials is because advanced composite refractory materials do not obey Hooke's Law. They are non-linear in their performance. The greater the non-linearity of the material, the greater its thermal shock resistance. It is thought that the thermal down-quenching of the material increases the non-linearity of the composite refractory material, and significantly increases the strain at fracture of the material, and thus increases its thermal shock resistance.

The quenching of the composite refractory materials may be effected using a medium other than water. Other liquids, or a blast of cool air (or other gas), or a fluidised bed, may be used to quench the material.

It has been ascertained that the enhanced thermal shock resistance of the materials which are subjected to a down-quench while being cooled from their sintering temperature is also exhibited when the quenching is performed in two or more steps. Such multiple quenching will be from a first elevated temperature to a second (lower) elevated temperature, then from that second elevated temperature to a third elevated (but lower) temperature or to ambient temperature, and so on if the third temperature is not ambient temperature. Each quenching step will reduce the temperature of the material by at least 50° C.

It will be appreciated that the composite refractory materials of the present invention may have matrix materials other than alumina and dispersed phases other than polycrystalline zirconia. Examples of other matrix materials and dispersed phases are shown in Table I.

TABLE I

| Matrix material | Dispersed phase |
| --- | --- |
| Mullite | Zirconia |
| Silicon nitride | Boron nitride |
| Barium titanate | Zirconia |
| Silicon carbide | Boron nitride |
| Alumina | Aluminium titanate |
| Spinel | Zirconia |
| Fosterite | Zirconia |

The materials of Table I are not an exhaustive list of composite refractory materials to which the present invention is applicable.

It should be noted that although examples of the present invention have been provided above, variations from those examples may be made without departing from the present inventive concept.

I claim:

1. A composite refractory material, having a porosity which does not exceed 12 percent, the composite refractory material comprising
(a) a matrix of a polycrystalline refractory ceramic material, a fraction of from 5 percent to 90 percent by volume of the crystalline grains thereof having a diameter in the range of from 15 micrometers to about 80 micrometers; and
(b) particles of a ceramic material dispersed in the matrix material, the dispersed particles occupying from 1.0 percent by volume to 40 percent by volume of the composite refractory material, each dispersed particle comprising an agglomerate of microcrystals which (i) are strongly bonded together, (ii) exhibit a strong thermal expansion anisotropy, and (iii) have a size such that cracks do not form spontaneously within the agglomerates during cooling from a temperature of about 1600° C. to room temperature; the dispersed ceramic material and the refractory material of the matrix being mutually chemically inert in the temperature range of the use of the composite refractory material;

further characterized in that (c) the matrix material is alumina and the dispersed ceramic material is monoclinic zirconia.

2. A method of making a composite refractory material comprising a matrix of a refractory material with particles of a ceramic material dispersed therein, the composite material having a porosity which does not exceed 12 percent, the dispersed particles occupying from 1.0 percent by volume to 40 percent by volume of the composite refractory material, each dispersed particle comprising an agglomerate of microcrystals which (i) are strongly bonded together, (ii) exhibit a strong thermal expansion anisotropy, and (iii) have a size such that cracks do not form spontaneously within the agglomerates during cooling from a temperature of about 1600° C. to room temperature; the ceramic material and the refractory material of the matrix being mutually chemically inert in the temperature range of the use of the composite refractory material; said method comprising the steps of (a) mixing together a powder of the matrix material, a powder of the polycrystalline ceramic material to be dispersed within the matrix material, and a fugitive binder;

(b) allowing the mixture to dry;

(c) granulating the dried powder mixture;

(d) preforming the granulated powder into at least one billet by die pressing;

(e) isostatically pressing the die pressed billet or billets to form at least one green billet for sintering;

(f) heating the at least one green billet at a predetermined rate until a sintering temperature in the range from 1200° C. to 1800° C. is reached;

(g) holding the at least one green billet at the sintering temperature for a period in the range from 0 to 5 hours; and (h) cooling the sintered billet or billets to ambient temperature;

characterised in that (i) during the cooling step, the or each sintered billet is either (i) thermally quenched to ambient temperature, the thermal quenching being effected when the sintered billet or billets have a temperature above ambient which is a value in the range of from 50° C. to 1500° C.; or (ii) given at least one thermal down-quench, the down-quench being of a temperature change in the range of from 50° C. to 1500° C.

3. A method as defined in claim 2, in which, during the cooling step, there is a single thermal down-quench of about 600° C.

4. A method as defined in claim 2, in which the period of holding the green billet or billets at the sintering temperature is sufficient to cause growth of the grains of matrix material until from 5 percent to 90 percent by volume of the matrix material in the product composite refractory material comprises grains having a diameter in the range from 15 micrometers to about 80 micrometers.

5. A method as defined in claim 2, in which from 5 percent to 90 percent by volume of the grains of the matrix material contained in the granulated powder mixture produced by step (c) have a diameter in the range from 15 micrometers to about 80 micrometers.

6. A method as defined in claim 2, in which the matrix material is alumina and the dispersed particles are particles of zirconia.

7. A method as defined in claim 2, in which the matrix material and dispersed ceramic material are selected from the group consisting of (a) mullite as the matrix material and zirconia as the dispersed material;

(b) silicon nitride as the matrix material and boron nitride as the dispersed material;

(c) barium titanate as the matrix material and zirconia as the dispersed material;

(d) silicon carbide as the matrix material and boron nitride as the dispersed material;

(e) alumina as the matrix material and aluminium titanate as the dispersed material;

(f) spinel as the matrix material and zirconia as the dispersed material; and (g) fosterite as the matrix material and zirconia as the dispersed material.

8. A method as defined in claim 4, in which, during the cooling step, there is a single thermal down-quench of about 600° C.

9. A method as defined in claim 5, in which, during the cooling step, there is a single thermal down-quench of about 600° C.

10. A method as defined in claim 6 in which, during the cooling step, there is a single thermal down-quench of about 600° C.

11. A method as defined in claim 7, in which, during the cooling step, there is a single thermal down-quench of about 600° C.

12. A composite refractory material, having a porosity which does not exceed 12 percent, the composite refractory material comprising (a) a matrix of a polycrystalline refractory ceramic material, a fraction of from 5 percent to 90 percent by volume of the crystalline grains thereof having a diameter in the range of from 15 micrometers to about 80 micrometers; and (b) particles of a ceramic material dispersed in the matrix material, the dispersed particles occupying from 1.0 percent by volume to 40 percent by volume of the composite refractory material, each dispersed particle comprising an agglomerate of microcrystals which (i) are strongly bonded together, (ii) exhibit a strong thermal expansion anisotropy, and (iii) have a size such that cracks do not form spontaneously within the agglomerates during cooling from a temperature of about 1600° C. to room temperature; the dispersed ceramic material and the refractory material of the matrix being mutually chemically inert in the temperature range of the use of the composite refractory material;

further characterized in that the matrix material and the dispersed ceramic material are selected from the group consisting of (1) mullite as the matrix material and zirconia as the dispersed material;

(2) silicon nitride as the matrix material and boron nitride as the dispersed material;

(3) barium titanate as the matrix material and zirconia as the dispersed material;

(4) silicon carbide as the matrix material and boron nitride as the dispersed material;

(5) alumina as the matrix material and aluminum titanate as the dispersed material;

(6) spinel as the matrix material and zirconia as the dispersed material; and (7) fosterite as the matrix material and zirconia as the dispersed material.

* * * * *

UNITED STATES PATENT AND TRADEMARK OFFICE
CERTIFICATE OF CORRECTION

PATENT NO. : 5,334,563
DATED : August 2, 1994
INVENTOR(S) : Gudrun H. Garvie

It is certified that error appears in the above-identified patent and that said Letters Patent is hereby corrected as shown below:

Cover page, left column, [73], line 2, delete "Organization" and insert therefor --Organisation--.

Signed and Sealed this

Twenty-fifth Day of August, 1998

Attest:

BRUCE LEHMAN

*Attesting Officer*  *Commissioner of Patents and Trademarks*